US011942699B2

(12) United States Patent
Lin et al.

(10) Patent No.: US 11,942,699 B2
(45) Date of Patent: Mar. 26, 2024

(54) ANTENNA DEVICE

(71) Applicants: Inventec (Pudong) Technology Corporation, Shanghai (CN); INVENTEC CORPORATION, Taipei (TW)

(72) Inventors: Hsin-Hung Lin, Taipei (TW); Wei Chen Cheng, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 171 days.

(21) Appl. No.: 17/806,733

(22) Filed: Jun. 13, 2022

(65) Prior Publication Data

US 2023/0155291 A1 May 18, 2023

(30) Foreign Application Priority Data

Nov. 15, 2021 (CN) ........................ 202111348648.4

(51) Int. Cl.
*H01Q 1/38* (2006.01)
*H01Q 1/42* (2006.01)
*H01Q 5/48* (2015.01)

(52) U.S. Cl.
CPC ................. *H01Q 5/48* (2015.01); *H01Q 1/38* (2013.01); *H01Q 1/422* (2013.01)

(58) Field of Classification Search
CPC ............ H01Q 1/38; H01Q 1/42; H01Q 1/422; H01Q 1/425; H01Q 5/328; H01Q 5/48; H01Q 9/0421; H01Q 9/045
See application file for complete search history.

(56) References Cited

U.S. PATENT DOCUMENTS

| | | | | |
|---|---|---|---|---|
| 2007/0285336 A1* | 12/2007 | Kamgaing | H01Q 1/523 343/895 |
| 2009/0079637 A1* | 3/2009 | Fukui | H01Q 15/008 343/700 MS |
| 2015/0130673 A1* | 5/2015 | Ng | H01Q 15/008 716/122 |
| 2019/0020100 A1* | 1/2019 | Jong | H01Q 1/48 |
| 2020/0076072 A1* | 3/2020 | Keyrouz | H01P 1/2005 |
| 2020/0358173 A1* | 11/2020 | Jong | H01Q 3/2617 |

FOREIGN PATENT DOCUMENTS

| | | |
|---|---|---|
| CN | 113270715 A | 8/2021 |
| TW | 200807807 A | 2/2008 |

* cited by examiner

*Primary Examiner* — Thai Pham
(74) *Attorney, Agent, or Firm* — CKC & Partners Co., LLC

(57) ABSTRACT

An antenna device includes a first insulation layer, a defected metal layer, a second insulation layer, and a plurality of radiators. The defected metal layer is disposed on the first insulation layer, and the defected metal layer has a plurality of recess features which are arranged with uniform pitches. The second insulation layer is disposed on the first insulation layer and the defected metal layer. The radiators are disposed on the second insulation layer, and each radiator has a feeding portion and a grounding portion.

15 Claims, 9 Drawing Sheets

ANTENNA DEVICE

CROSS-REFERENCE TO RELATED APPLICATION

This application claims priority to China Application Serial Number 202111348648.4, filed Nov. 15, 2021, which is herein incorporated by reference in its entirety.

BACKGROUND

Field of Invention

The present invention relates to an antenna device. Especially, the present invention relates to an antenna device with a Multi-Input and Multi-Output (MIMO) system.

Description of Related Art

The 5th generation mobile networks (5G) have dramatically developed, and multi-input and multi-output systems (MIMO) which are applied to smart phones, laptops, and tablets have been arrangement targets for the industries. How to dispose multi-antenna devices in a limited space, keep the multi-antenna devices with good performance and easy fabrication, and modularize antenna devices have become critical issues of product sales.

Therefore, how to provide a antenna device that is small in size, simple in process, and widely used in multiple frequency bands has become a research target for private enterprises and academic institutions to invest a lot of money, manpower, and time.

SUMMARY

The invention provides an antenna device includes a first insulation layer, a defected metal layer, a second insulation layer, and a plurality of radiators. The defected metal layer is disposed on the first insulation layer, and the defected metal layer has a plurality of recess features which are arranged with uniform pitches. The second insulation layer is disposed on the first insulation layer and the defected metal layer. The radiators are disposed on the second insulation layer, and each radiator has a feeding portion and a grounding portion.

In some embodiments of the present invention, the recess features comprise linear first recesses and linear second recesses, and the first recesses extend along a first direction and are spaced apart from each other. The second recesses extend along a second direction and are spaced apart from each other, and the first and second recesses are intersected to form cross lattice patterns.

In some embodiments of the present invention, each first recess has a first width, and each second recess has a second width. A ratio of the first width to the second width ranges from 1 to 5.

In some embodiments of the present invention, the first width ranges from 0.15 mm to 0.25 mm, and the second width ranges from 0.05 mm to 0.15 mm.

In some embodiments of the present invention, the grounding portions of the first radiators respectively extend through intersections wherein the first recesses crossing the second recesses respectively.

In some embodiments of the present invention, the antenna device of claim 1 further includes a grounding metal layer, and the grounding metal layer is disposed below the first insulation layer, the grounding portion of each radiator is electrically connected to the grounding metal layer.

In some embodiments of the present invention, the grounding portion of each radiator penetrates the first insulation layer and the second insulation layer.

In some embodiments of the present invention, the radiators include a plurality of first F-shaped radiators, and each first F-shaped radiator includes a free end. The free ends of two of the first F-shaped radiators and the free ends of another two of the first F-shaped radiators respectively face towards opposite directions of a first axial direction.

In some embodiments of the present invention, the radiators include a plurality of second F-shaped radiators, and each of the second F-shaped radiators includes a free end. The free ends of two of the second F-shaped radiators and the free ends of another two of the second F-shaped radiators respectively face towards opposite directions of a second axial direction perpendicular to the first axial direction.

In some embodiments of the present invention, the first F-shaped radiators are disposed between the two and the another two of the second F-shaped radiators.

Another aspect of the present invention relates to an antenna device including a first insulation layer, a defected metal layer, a second insulation layer, and a plurality of radiators. The defected metal layer is disposed on the first insulation layer, and the defected metal layer has a plurality of recess features which are arranged with uniform pitches. The recess features include linear first recesses and liner second recesses which respectively cross the first recesses. The second insulation layer is disposed on the first insulation layer and the defected metal layer. The radiators are disposed on the second insulation layer, and each radiator has a feeding portion and a grounding portion.

In embodiments of the present invention, isolations between radiators of the antenna device in the present invention is outstanding. For instance, the isolation among the radiators is at least −15 dB, so the antenna device can be used in 3.5 Ghz of frequency band. In addition, a defected metal layer can prevent the radiators from being affected by metal conductors around the radiators, so the antenna device can operate in multiple frequency bands under various circumstances.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
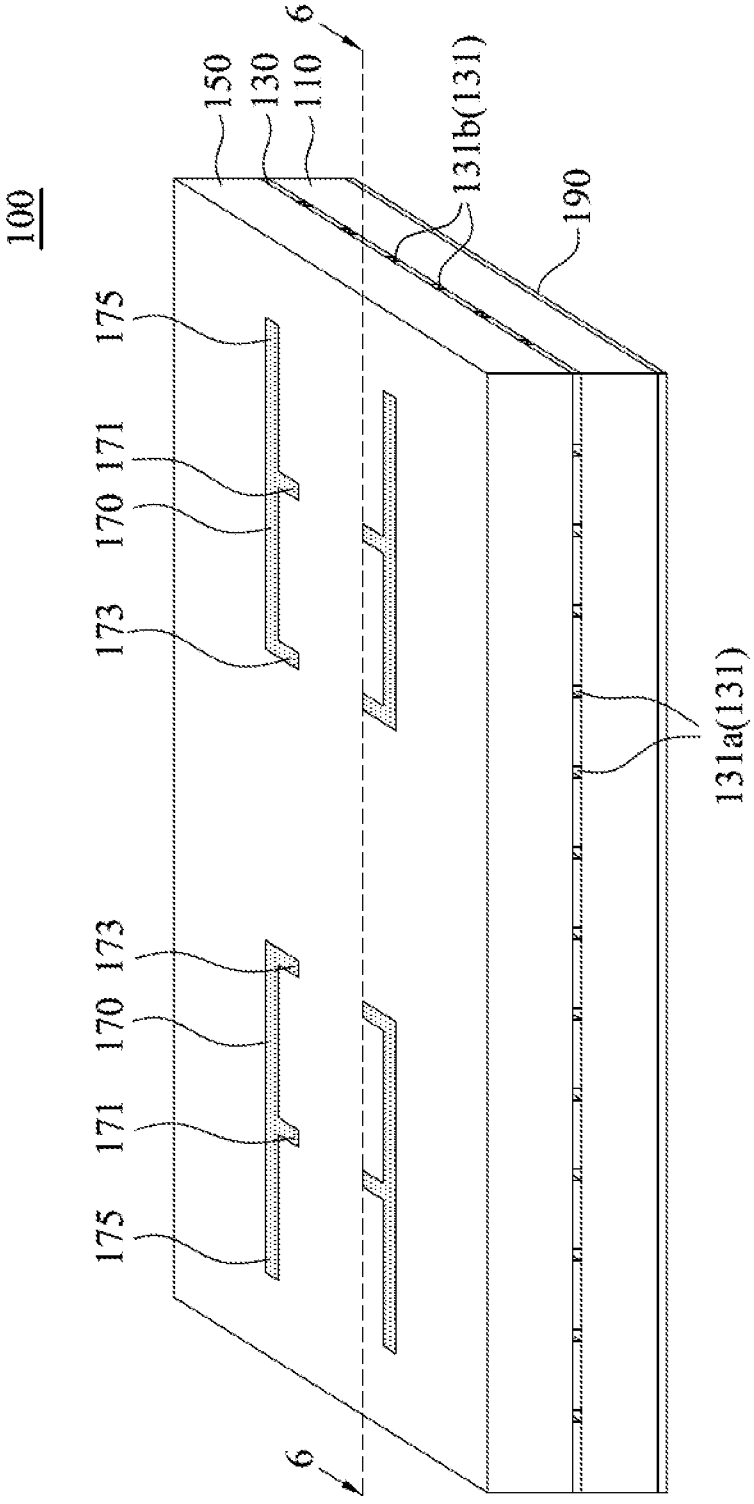
FIG. 1 illustrates a schematic view of an antenna device in accordance with some embodiments of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
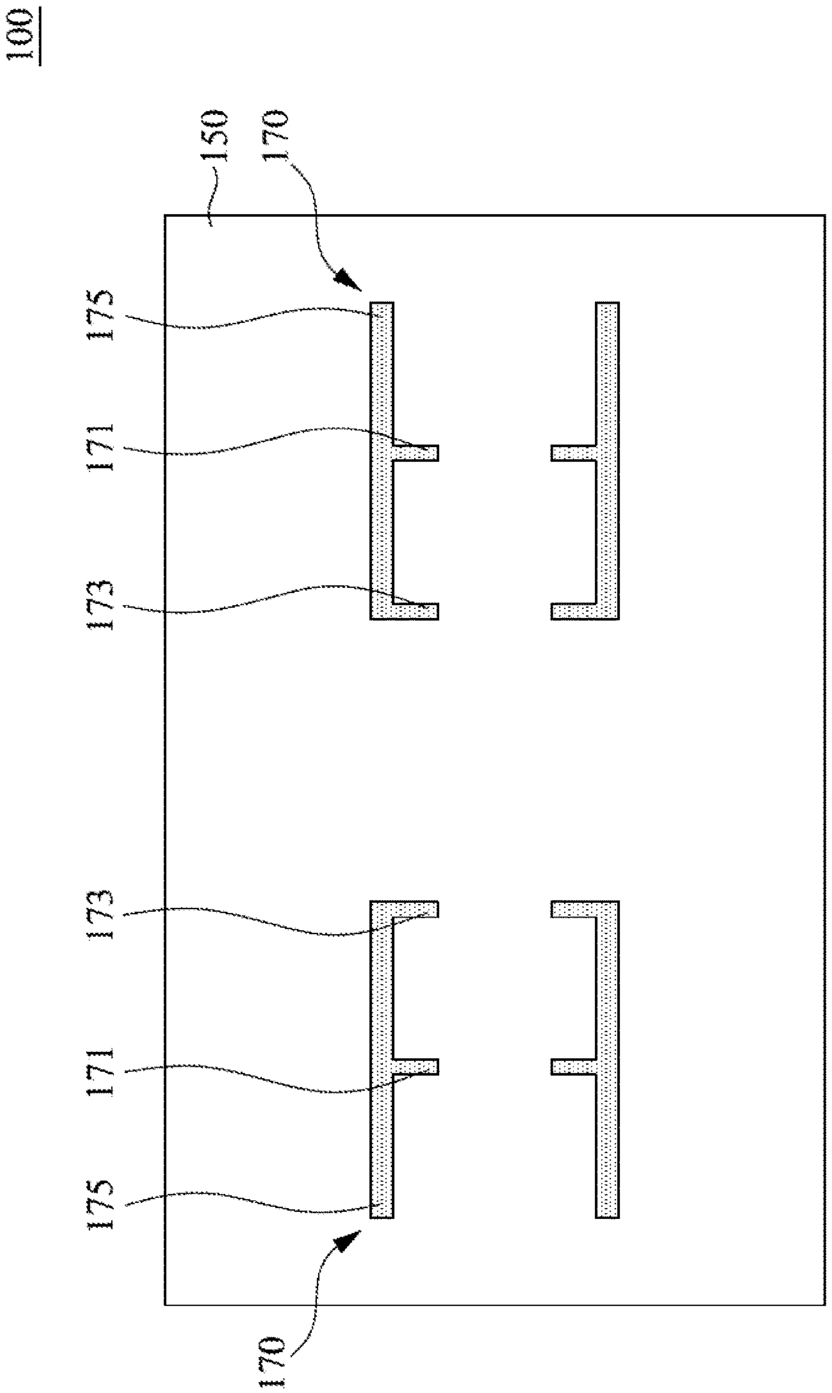
FIG. 2 illustrates a top view of an antenna device in accordance with some embodiments of the present invention.
Figure 3:
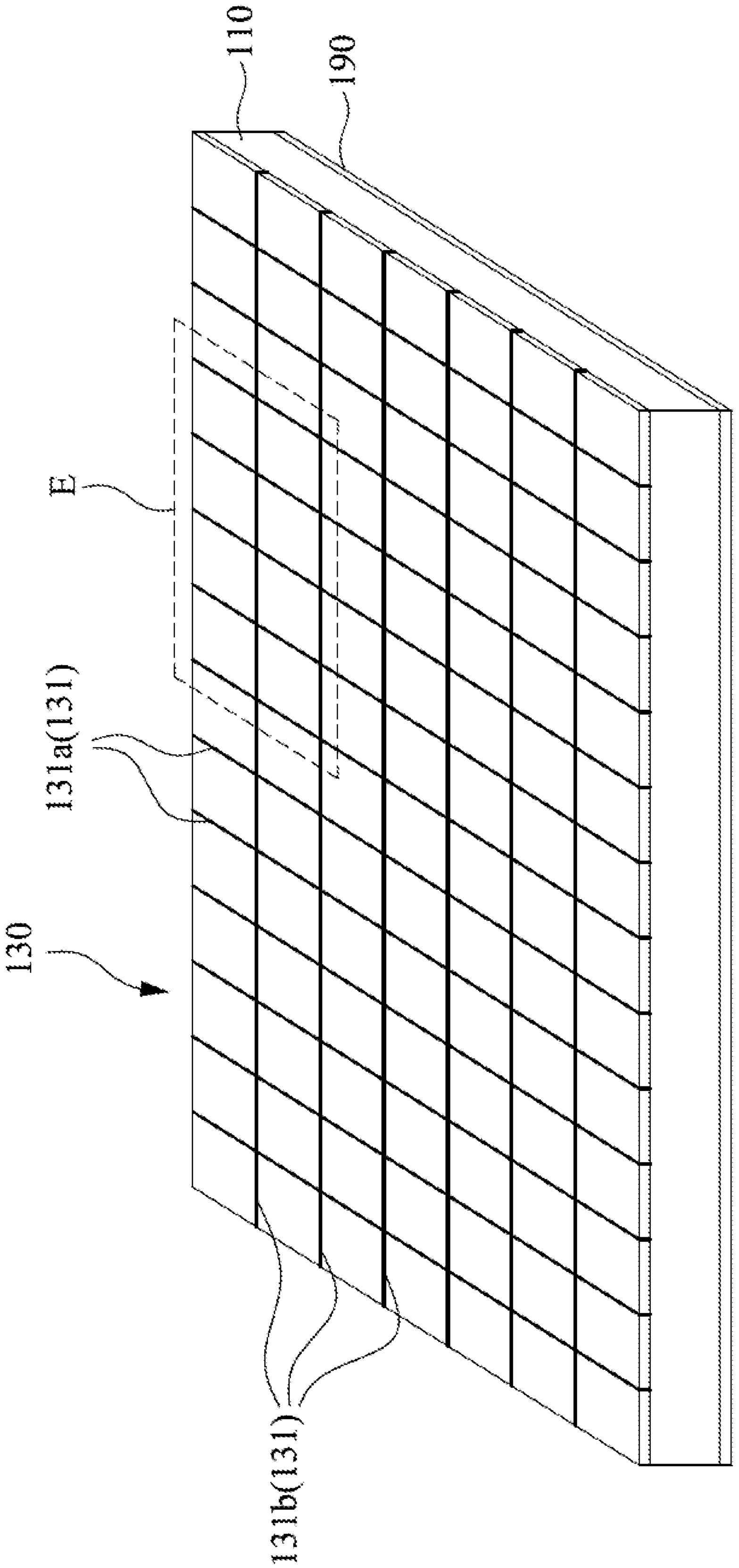
FIG. 3 illustrates a schematic view of a first insulation layer and a defected metal layer in accordance with some embodiments of the present invention.
Figure 4:
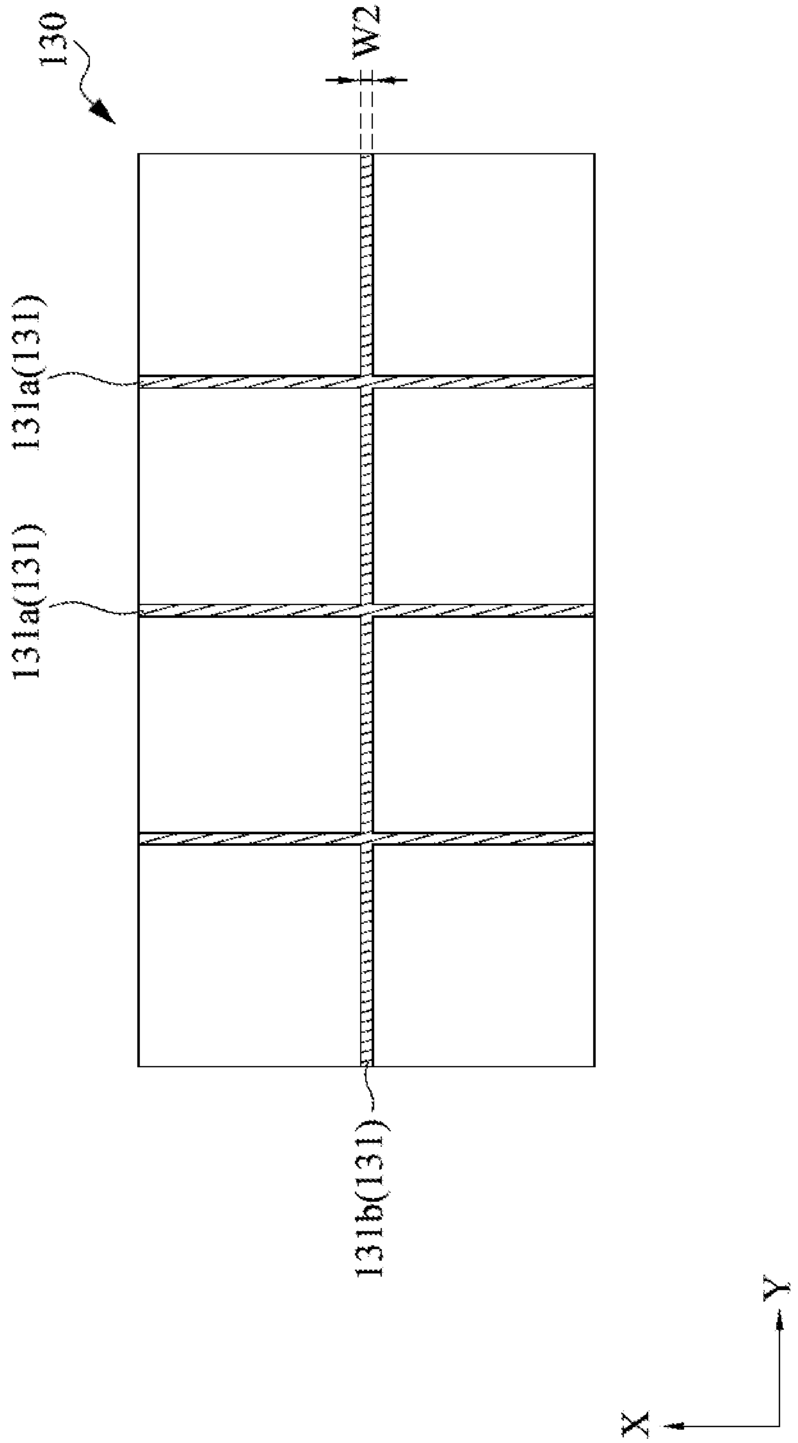
FIG. 4 illustrates an enlarged view of the dotted square E in FIG. 3.
Figure 5:
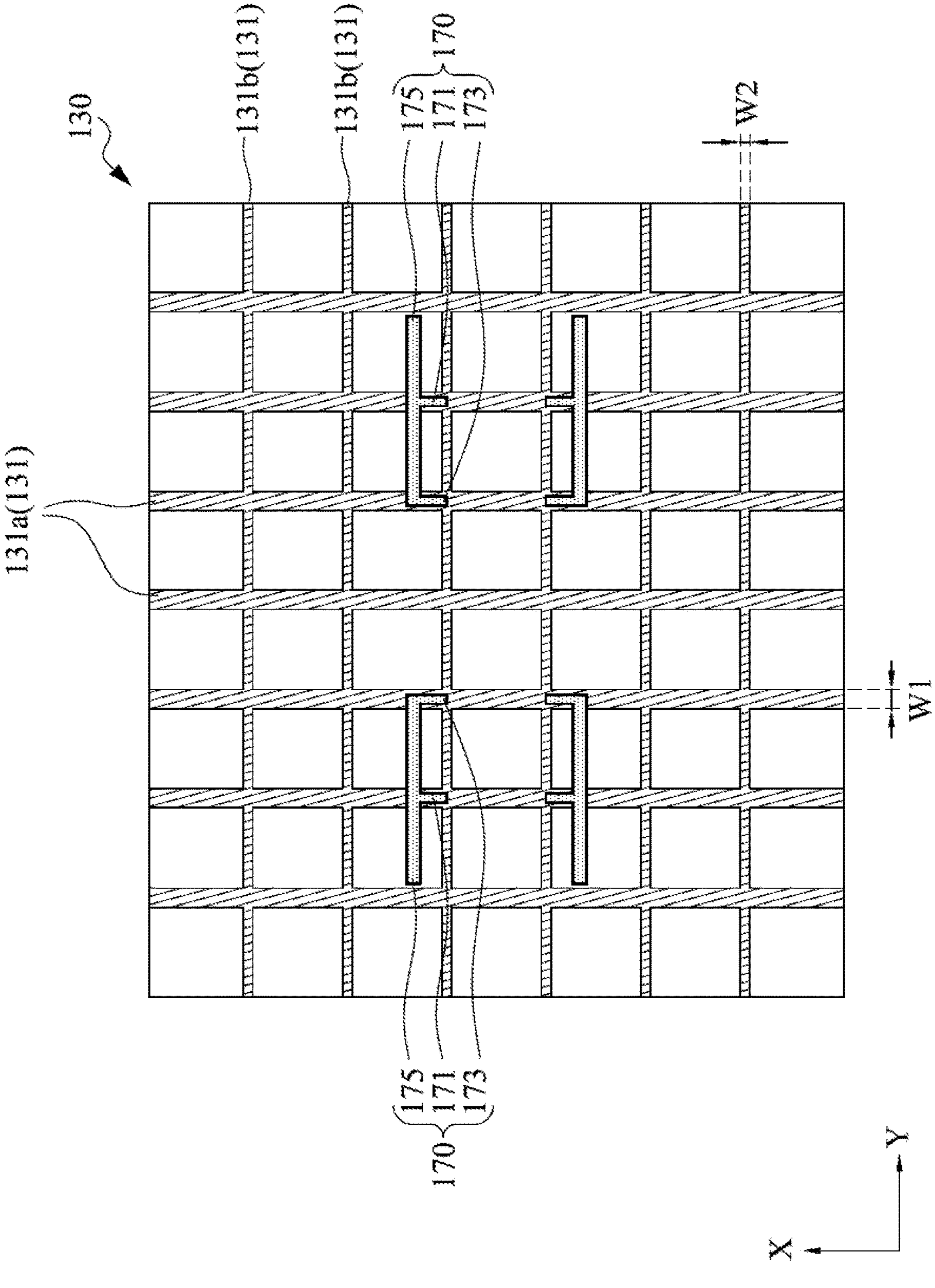
FIG. 5 illustrates a positional relationship about a defected metal layer and radiators of an antenna device from a top view in accordance with some embodiments of the present invention.

Reference is made to FIGS. 1-5. FIG. 1 illustrates a schematic view of an antenna device 100, and the antenna device 100 includes a first insulation layer 110, a defected metal layer 130, a second insulation layer 150, and a plurality of radiators 170. FIG. 2 illustrates a top view of the antenna device 100. FIG. 3 illustrates a schematic view of the first insulation layer 110 and the defected metal layer 130 of the antenna device 100. FIG. 4 illustrates an enlarged view of the dotted square E in FIG. 3. FIG. 5 illustrates a positional relationship about the defected metal layer 130 and the radiators 170 of the antenna device 100 from a top view, and the second insulation layer 150 is neglected. In some embodiments of the present invention, the defected metal layer 130 is located on the first insulation layer 110, and the defected metal layer 130 has a plurality of recession features 131 which are arranged with uniform pitches. In addition, the second insulation layer 150 is located on the first insulation layer 110 and the defected metal layer 130, and the radiators 170 are located on the second insulation layer 150. Each radiator 170 includes a feeding portion 171 and a grounding portion 173. The defected metal layer 130 is configured to influence a current path of the radiators 170 and prevent the radiators 170 from being affected by each other or any metallic conductor around the radiators 170 such that the antenna device 100 can operate in multiple frequency bands. The present invention is not limited in this respect.

Specifically, the first insulation layer 110 and the second insulation layer 150 include an insulation material such as epoxy and or glass fiber, and the present invention is not limited in this respect. In addition, the defected metal layer 130 and the radiators 170 includes metallic material such as copper and copper alloy. The defected metal layer 130 can be manufactured by a laser cutting process, an etching process, or a machining process, and the radiators 170 are antennas with F-shaped metal planar structures. The present invention is not limited in this respect.

Figure 6:
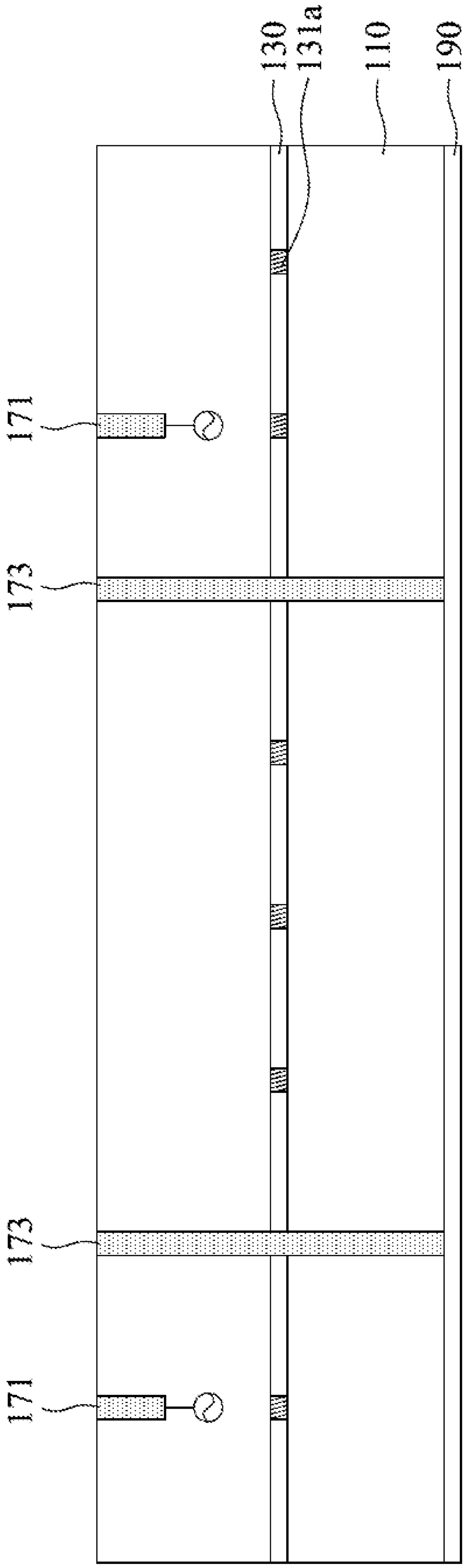
FIG. 6 illustrates a cross section view taken from a cross section line 6-6 in FIG. 1.

In some embodiments of the present invention, the recess features 131 of the defected metal layer 130 includes a plurality of first recesses 131*a* which are linear and a plurality of second recesses 131*b* which are linear, and the first recesses 131*a* which are spaced apart from each other straightly extend along a first axial direction X, in which the first recesses 131*a* are equally spaced apart. The second recesses 131*b* which are spaced apart from each other straightly extend along a second axial direction Y which is perpendicular to the first axial direction X, and the second recesses 131*b* are equally spaced, in which the first recesses 131*a* and the second recesses 131*b* are intersected to form cross lattice patterns. In some embodiments of the present invention, the feeding portion 171 of each radiator 170 is electrically connected to a signal feed-in source, and the grounding portion 173 of each radiator 170 is electrically connected to a grounding source. Reference is made to FIG. 6 which illustrates a cross section view taken from a cross section line 6-6 in FIG. 1. The grounding portions 173 of the radiators 170 extend through the first recesses 131*a* and/or the second recesses 131*b*. For instance, the grounding portions of the radiators 170 are respectively disposed at intersections wherein the first recesses 131*a* crossing the second recesses respectively, and the grounding portions 173 of the radiators 170 penetrate the first insulation layer 110 and the second insulation layer 150 to be in contact with the grounding metal layer 190.

In some embodiments of the present invention, each first recess 131*a* has a first width W1, and each second recess 131*b* has a second width W2. The first width W1 is greater than the second width W2, and a ratio of the first width W1 to the second width W2 ranges from 1 to 5. In embodiments of the present invention, a ratio of the first width W1 to the second width W2 ranges from 1.5 to 3.5. For instance, a ratio of the first width W1 to the second width W2 is 2. In some embodiments of the present invention, the first width W1 ranges from 0.15 millimeters to 0.25 millimeters, and the second width W2 ranges from 0.05 millimeters to 0.15 millimeters. In some embodiments of the present invention, the first width W1 is about 0.2 millimeters, and the second width W2 is about 0.1 millimeters. The present invention is not limited in this respect.

In some embodiments of the present invention, the radiators 170 includes four F-shaped radiators 170, and each F-shaped radiator 170 includes a free end 175. Two of the free ends 175 of the F-shaped radiators 170 and another two of the free ends 175 of the F-shaped radiators 175 respectively face towards opposite directions in the first axial direction. In addition, two of the F-shaped radiators 170 are aligned with each other along the first axial direction X, and another two of the radiators 170 are aligned with each other along the second axial direction Y. Therefore, four of the F-shaped radiators 170 are in a mirror symmetry, and the present invention is not limited in this respect. Specifically, the feeding portion 171 and the grounding portion 173 of the radiators 170 extends toward the same direction, and the free end 175 faces towards a different direction from the direction toward which the feeding portion 171 and the grounding portion 173 extend. For instance, the free end 175 face towards a direction perpendicular to the direction toward which the feeding portion 171 and the grounding portion 173 extend.

In some embodiments of the present invention, the antenna device 100 further includes the grounding metal layer 190, and the grounding metal layer 190 is disposed beneath the first insulation layer 110. The grounding metal layer 190 is electrically connected to the radiators 170 to provide a grounding function. In addition, the antenna device 100 includes a conductive path which is in the first insulation layer 110 and the second insulation layer 150, and the conductive path can include a metal conductive wire such as copper conductive wire. The metal conductive wire penetrates the first insulation layer 110 and the second insulation layer 150 such that the grounding portion 173 of the F-shaped radiators 170 is in contact with the conductive path and connected to the grounding metal layer 190 via the conductive path. Specifically, the grounding metal layer 190 is a flat metal foil, and the grounding metal layer 190 includes a metallic material such as copper and copper alloy. The present invention is not limited in this respect.

Figure 7:
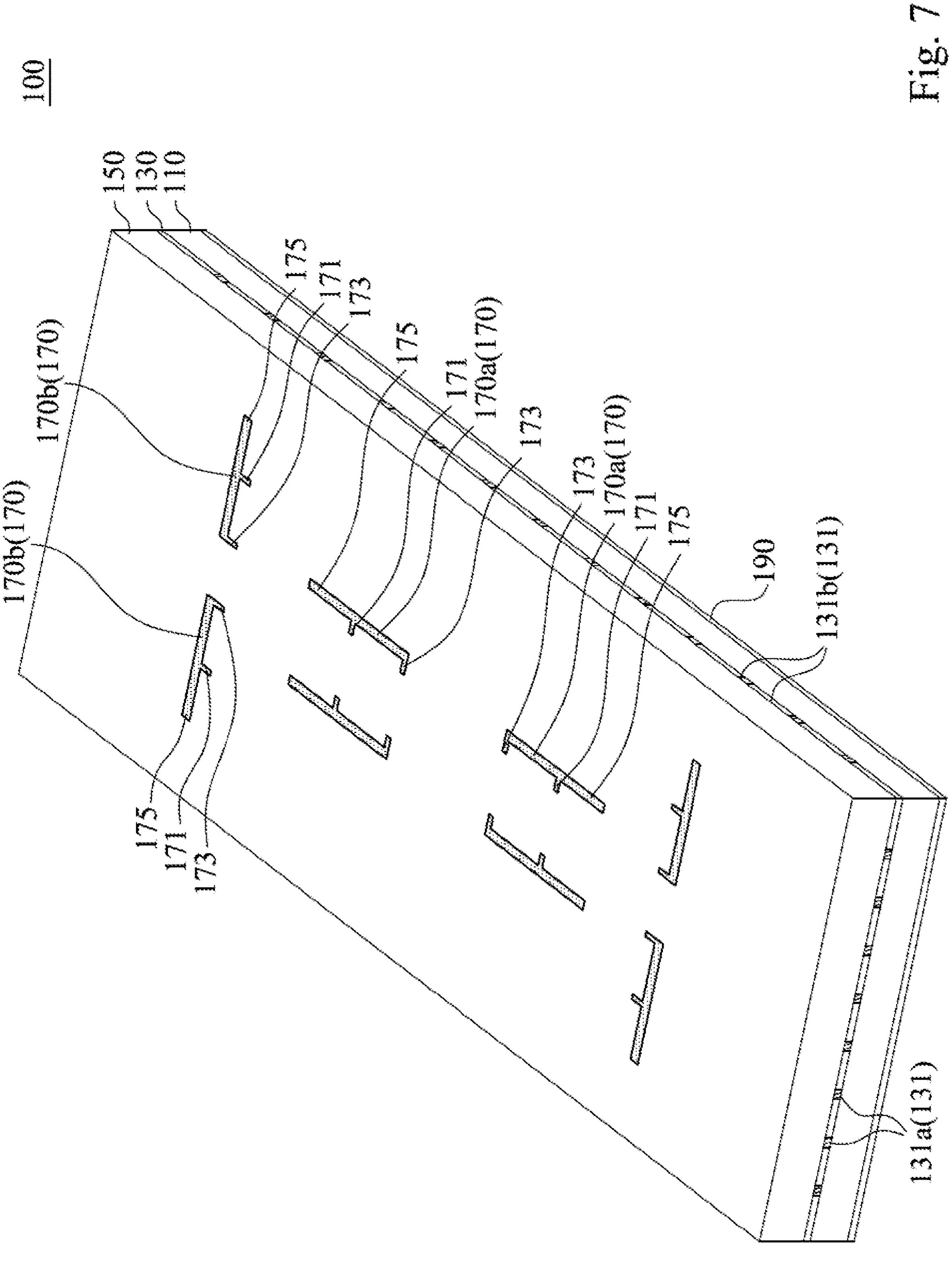
FIG. 7 illustrates a schematic view of an antenna device in accordance with some embodiments of the present invention.
Figure 8:
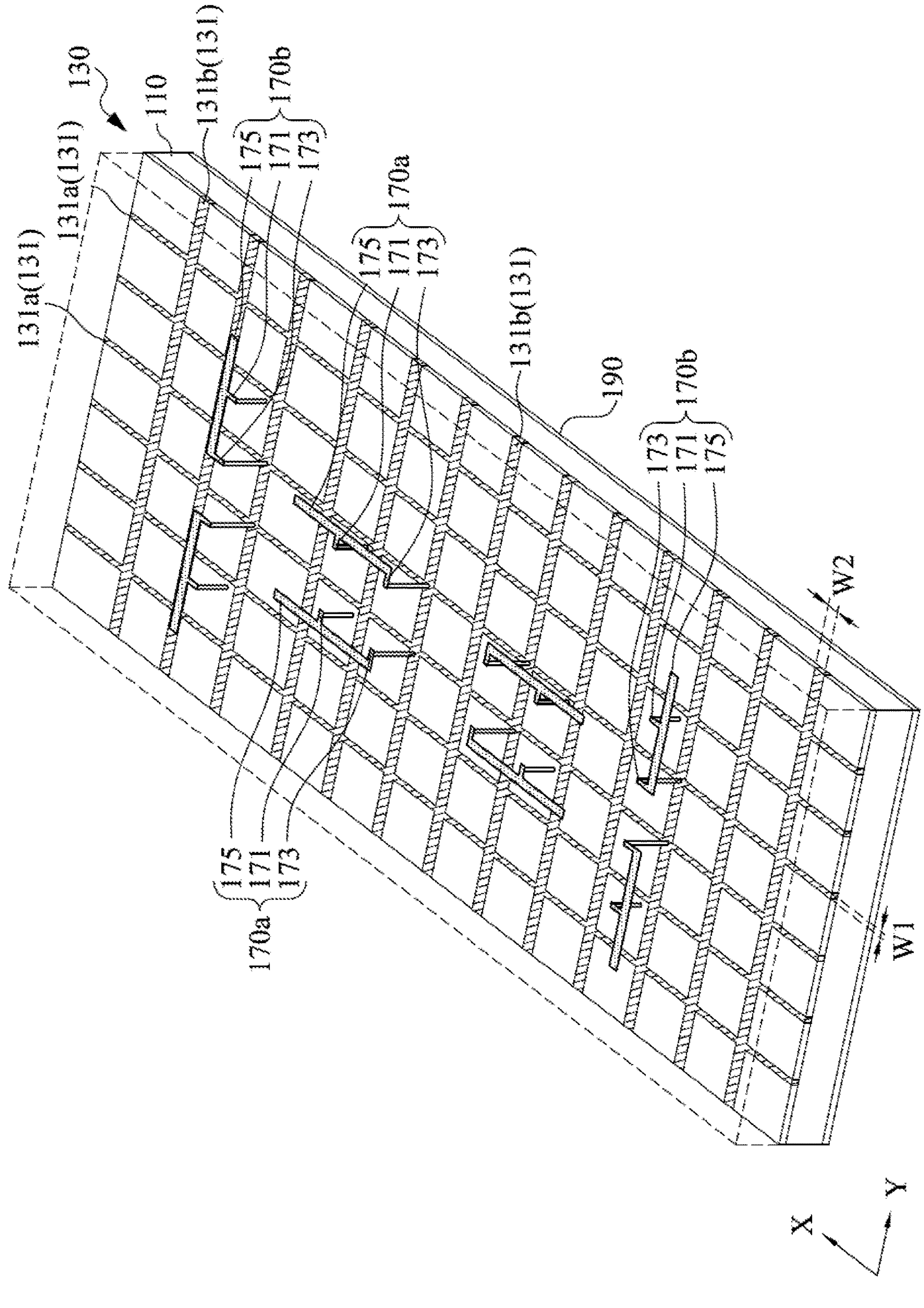
FIG. 8 illustrates a partial schematic view of an antenna device in accordance with some embodiments of the present invention.

Reference is made to FIGS. 7-8. FIG. 7 illustrates a schematic view of the antenna device 100. FIG. 8 illustrates a positional relationship between the defected metal layer 130 and the radiators 170, and FIG. 8 neglects the second insulation layer 150. In some embodiments of the present invention, the radiators 170 includes four first F-shaped radiators 170*a* and four second F-shaped radiators 170*b*, and the first F-shaped radiators 170*a* are located between two and another two of the second F-shaped radiators 170*b*, in which the second F-shaped radiators 170*b* surround the first F-shaped radiators 170*a*. In addition, two free ends 175 of two of the first F-shaped radiators 170*a* and two free ends 175 of another two of the first F-shaped radiators 170*a* respectively face toward opposite directions in the first axial direction X. The second F-shaped radiators 170*b* further include free ends 175, and the free ends 175 of two of the second F-shaped radiators 170*b* and the free ends 175 of another two of the second F-shaped radiators 170*b* respectively face toward opposite directions in the second axial direction Y. The present invention is not limited in this respect.

In some embodiments of the present invention, two of the four first F-shaped radiators 170*a* are aligned along the first axial direction X, and two of the four first F-shaped radiators 170*a* are aligned along the second axial direction Y such that the four first F-shaped radiators 170*a* are in mirror symmetry. In addition, two of the four second F-shaped radiators 170*b* are aligned along the first axial direction X, and two of the four second F-shaped radiators 170*b* are aligned along the second axial direction Y such that the four second F-shaped radiators 170*b* are in mirror symmetry. Specifically, the four first F-shaped radiators 170*a* and the four second F-shaped radiators 170*b* are also in mirror symmetry.

Figure 9:
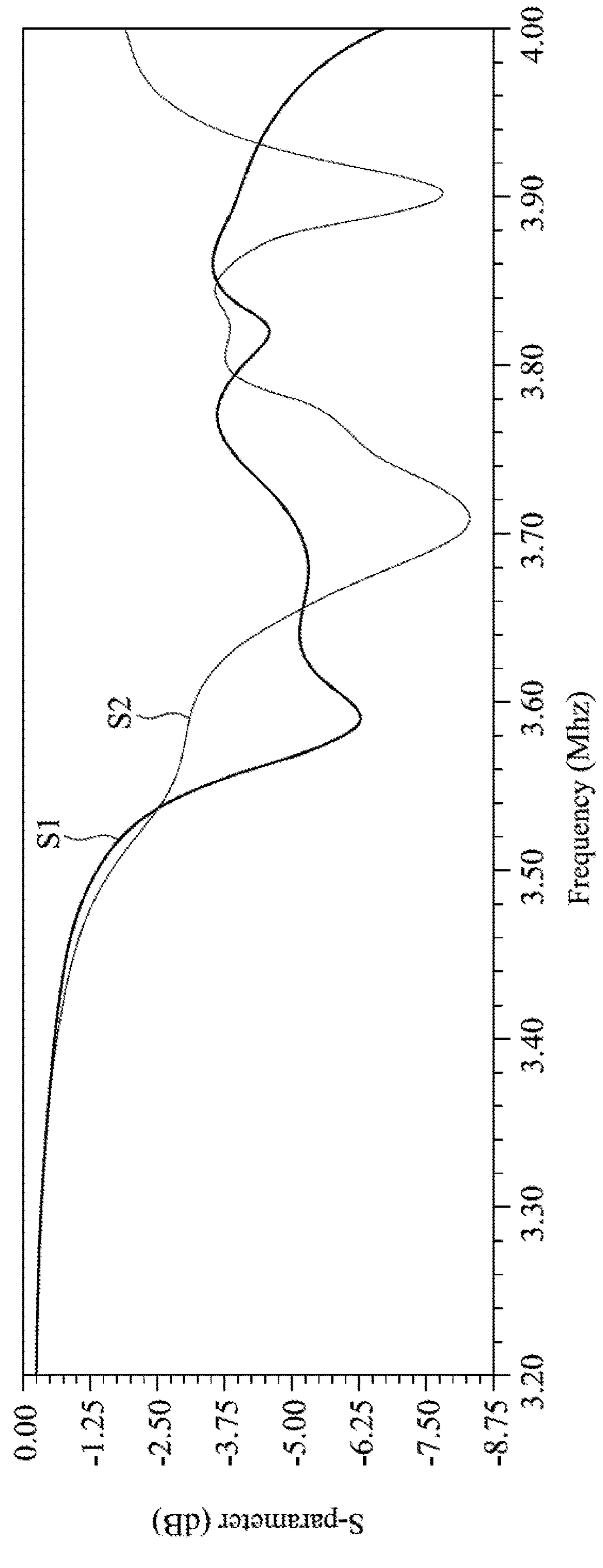
FIG. 9 illustrates a return loss diagram of an antenna device in accordance with some embodiments of the present invention.

Reference is made to FIG. 9. FIG. 9 illustrates a return loss diagram regarding the antenna device 100 in FIGS. 7-8, and a curved line 51 and a curved line S2 respectively represent the first F-shaped radiators 170*a* and the second F-shaped radiators 170*b*. As known from FIG. 9, the antenna device 100 is well applied in 3.5 Ghz of frequency band. In addition, the isolation between the first F-shaped radiators 170*a* and the second F-shaped radiators 170*b* is about −15 dB, so the first F-shaped radiators 170*a* and the second F-shaped radiators 170*b* do not negatively affect each other, so as to prevent the antenna device 100 from being affecting and interfering by a metal conductor around the antenna device 100.

In embodiments of the present invention, isolations between radiators of the antenna device in the present invention is outstanding. For instance, the isolation among the radiators is at least −15 dB, so the antenna device can be used in 3.5 Ghz of frequency band. In addition, a defected metal layer can prevent the radiators from being affected by metal conductors around the radiators, so the antenna device can operate in multiple frequency bands under various circumstances.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An antenna device, comprising:

a first insulation layer;

a defected metal layer disposed on the first insulation layer, wherein the defected metal layer has a plurality of recess features which are arranged with uniform pitches;

a second insulation layer disposed on the first insulation layer and the defected metal layer; and a plurality of radiators disposed on the second insulation layer, wherein each radiator has a feeding portion and a grounding portion.

2. The antenna device of claim 1, wherein the recess features comprise linear first recesses and linear second recesses, the first recesses extend along a first direction and are spaced apart from each other, and the second recesses extend along a second direction and are spaced apart from each other, wherein the first and second recesses are intersected to form cross lattice patterns.

3. The antenna device of claim 2, wherein each first recess has a first width, each second recess has a second width, and wherein a ratio of the first width to the second width ranges from 1 to 5.

4. The antenna device of claim 3, wherein the first width ranges from 0.15 mm to 0.25 mm, the second width ranges from 0.05 mm to 0.15 mm.

5. The antenna device of claim 2, wherein the grounding portions of the first radiators extend through intersections where the first recesses crossing the second recesses respectively.

6. The antenna device of claim 1, further comprising a grounding metal layer, wherein the grounding metal layer is disposed below the first insulation layer, the grounding portion of each radiator is electrically connected to the grounding metal layer.

7. The antenna device of claim 6, wherein the grounding portion of each radiator penetrates the first insulation layer and the second insulation layer.

8. The antenna device of claim 1, wherein the radiators include a plurality of first F-shaped radiators, each first F-shaped radiator includes a free end, wherein the free ends of two of the first F-shaped radiators and the free ends of another two of the first F-shaped radiators respectively face towards opposite directions in a first axial direction.

9. The antenna device of claim 8, wherein the radiators include a plurality of second F-shaped radiators, each second F-shaped radiator includes a free end, wherein the free ends of two of the second F-shaped radiators and the free ends of another two of the second F-shaped radiators respectively face towards opposite directions in a second axial direction perpendicular to the first axial direction.

10. The antenna device of claim 9, wherein the first F-shaped radiators are disposed between the two and the another two of the second F-shaped radiators.

11. An antenna device, comprising:

a first insulation layer;

a defected metal layer disposed on the first insulation layer, wherein the defected metal layer has a plurality of recess features which are arranged with uniform pitches, and wherein the recess features comprise linear first recesses and liner second recesses which respectively cross the first recesses;

a second insulation layer disposed on the first insulation layer and the defected metal layer; and a plurality of radiators disposed on the second insulation layer, wherein each radiator has a feeding portion and a grounding portion.

12. The antenna device of claim 11, wherein each first recess has a first width, each second recess has a second width, and wherein a ratio of the first width to the second width ranges from 1 to 5.

13. The antenna device of claim 12, wherein the first width ranges from 0.15 mm to 0.25 mm, the second width ranges from 0.05 mm to 0.15 mm.

14. The antenna device of claim 12, wherein the grounding portions of the first radiators respectively extend through intersections where the first recesses crossing the second recesses respectively.

15. The antenna device of claim 11, further comprising a grounding metal layer, wherein the grounding metal layer is disposed below the first insulation layer, the grounding portion of each radiator is electrically connected to the grounding metal layer.

* * * * *